(12) United States Patent
Eidsness

(10) Patent No.: US 6,401,336 B1
(45) Date of Patent: Jun. 11, 2002

(54) RESISTANCE WELDING OF SPRAY GUN VALVE ASSEMBLY

(75) Inventor: Collin O. Eidsness, Westminster, CO (US)

(73) Assignee: Morrow Tech Industries, LLC, Broomfield, CO (US)

( * ) Notice: Subject to any disclaimer, the term of this patent is extended or adjusted under 35 U.S.C. 154(b) by 0 days.

(21) Appl. No.: 09/644,322

(22) Filed: Aug. 23, 2000

Related U.S. Application Data

(60) Provisional application No. 60/150,777, filed on Aug. 26, 1999.

(51) Int. Cl.[7] .................................................. B21K 1/20
(52) U.S. Cl. ............................ 29/890.129; 29/890.131; 29/890.124; 29/525.14
(58) Field of Search ...................... 29/890.129, 890.124, 29/890.131, 419.2, 428, 525.14, 525.13; 219/117.1; 251/368, 15.18

(56) References Cited

U.S. PATENT DOCUMENTS

| | | | |
|---|---|---|---|
| 4,235,003 A | * | 11/1980 | Gachot |
| 4,752,026 A | * | 6/1988 | Van De Griend |
| 5,185,508 A | * | 2/1993 | Perkinson, III |
| 5,361,693 A | | 11/1994 | Farb et al. |
| 5,374,032 A | * | 12/1994 | Pearson et al. |
| 5,541,384 A | * | 7/1996 | Tsuzuki et al. |
| 6,105,928 A | * | 8/2000 | Ise et al. |
| 6,259,054 B1 | * | 7/2001 | Broadhead |

* cited by examiner

Primary Examiner—S. Thomas Hughes
Assistant Examiner—T. Nguyen
(74) Attorney, Agent, or Firm—Sheridan Ross P.C.

(57) ABSTRACT

A spray gun valve assembly is disclosed together with a method for manufacturing the same, wherein a spray gun valve plug (e.g., made of materials such as a tungsten carbide alloy) is secured to an end of an elongate valve stem (e.g., made of stainless steal) by resistance welding techniques. A holder component may act as an intermediate component between the plug and the valve stem, wherein the plug is resistance welded to the holder, and the holder is secured to the end of the valve stem. The method for securing the holder and the valve stem components can provide both a weld and a mechanical lock to secure these components together.

6 Claims, 4 Drawing Sheets

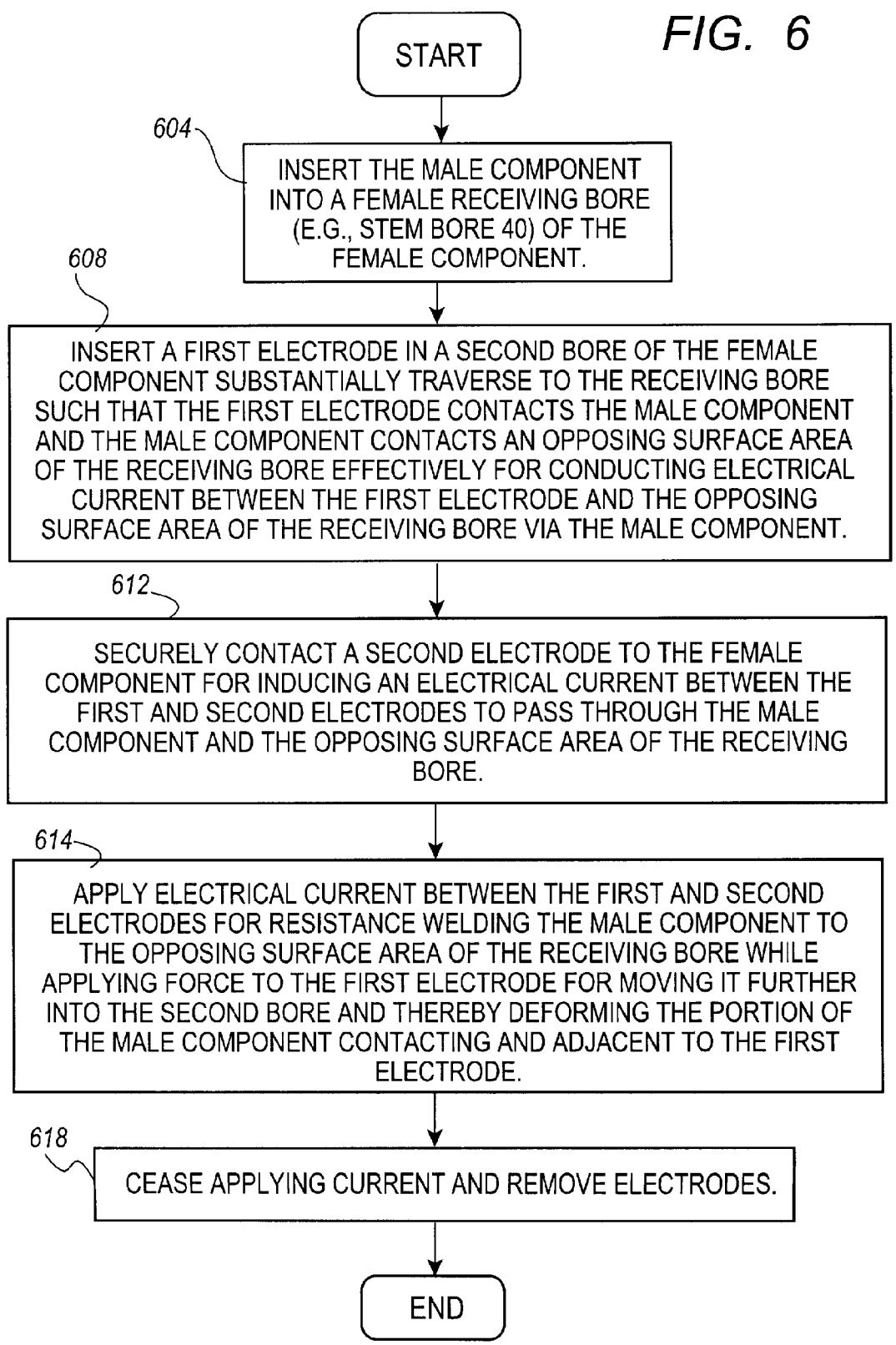

RESISTANCE WELDING OF SPRAY GUN VALVE ASSEMBLY

RELATED APPLICATION

This application claims priority from U.S. Provisional Patent Application No. 60/150,777 filed on Aug. 26, 1999. The entire disclosure of the provisional application is considered to be part of the disclosure of the accompanying application and is hereby incorporated by reference.

BACKGROUND OF THE INVENTION

For controlling the flow of a fluid to be sprayed, it is common for spray guns to have a valve assembly that includes a valve plug and an attached valve stem. The valve plug is operable for (a) seating with the interior of a fluid spray nozzle or valve seat adjacent the nozzle's fluid exit for thereby prohibiting fluid exit, and (b) retracting from this nozzle or valve seat when it is desirable to spray the fluid. Typically, the valve plug has a generally spherical configuration and is attached to an end of the valve stem via an intermediate component denoted as a "holder" herein. Accordingly, when the valve assembly is operably incorporated into a spray gun, a trigger for the spray gun is used to pull the valve plug from its seat or seal with the interior of the fluid nozzle for thereby allowing the fluid to exit the spray nozzle. Since many fluids to be sprayed are abrasive, the valve plugs are manufactured from abrasion resistant materials such as alloys of tungsten carbide. Moreover, since tungsten carbide is relatively expensive (and difficult to machine) and other components of such valve assemblies are not subject to the extreme abrasive wear of the valve plug, the valve shaft and any other components of such valve assemblies are typically manufactured from less expensive materials such as stainless steel.

Heretofore, it has been difficult to reliably secure such tungsten carbide alloy valve plugs to the other components of the valve assemblies. In particular, a high proportion of such valve assemblies break long before there is significant abrasive wear. That is, the prior art techniques for securing such valve plugs to the other components of their corresponding valve assemblies has been substantially inadequate for inexpensively producing highly reliable valve assemblies. For example, one common technique for securing valve plugs within their corresponding valve assemblies is to braze the valve plug onto an end of the valve stem or onto an intermediate valve plug holder. However, a brazing process results in unsatisfactory valve assemblies for the following reasons (1.1) through (1.3) below:

(1.1) Brazing results in relatively unreliable joints between the valve plug and the other components of the corresponding valve assembly. For instance, during manufacturing of such brazed valve assemblies, stress testing of the brazed joints can have a failure rate as high as 50% of the valve assemblies produced.

(1.2) The solder used as brazing material is relatively soft and the resulting soldered joint for securing the valve plug is prone to failure during use. A typical (spherical) valve plug may have a diameter of approximately 0.125" and the brazed, soldered joint contacting the valve seat is likely to be much less than a single hemisphere of the valve seat. Additionally, it is not uncommon for spray guns to have fluid spray pressures of 3,000 psi and accordingly, a force of approximately 100 lbs. may be required to disengage the valve plug from its seal with the spray fluid nozzle. Moreover, a corresponding opposite force may be applied to the valve plug as it reseals with the fluid nozzle. Thus, the soldered joint may fail before the valve plug is abraded to the extent that it fails to fully seat with the fluid nozzle.

(1.3) Brazing is prone to spatter solder on the valve plug. This spatter may result in the valve plug not fully sealing with the spray fluid nozzle if not removed. Accordingly, it is not uncommon in the manufacture of such prior art brazed valve assemblies to manually examine and remove such spattering.

Thus, it would be desirable to have a process for more reliably attaching valve plugs to their corresponding valve assemblies. In particular, it would be desirable to attach such valve plugs to their valve shafts by welding rather than brazing.

Additionally, the securing of the valve stem within a resulting valve assembly has typically required that an end of the valve stem be secured within a bore of an intermediate component (i.e., the "holder") between the valve plug and the valve stem. Further, in order to withstand the forces as described in (1.2) above, the valve stem end may be mashed, cold headed or otherwise flared so that this end cannot easily exit the bore. Subsequently, this stem end may be further affixed within the holder by another brazing process.

Thus, it would be additionally desirable to have a process for more easily securing the valve stem to the holder. In particular, it would be desirable to secure the valve stem to the holder by a simple welding process, wherein there is no need to flare the end of the valve stem prior to welding.

SUMMARY

The present invention is a novel spray gun valve assembly and process for manufacturing the same. In particular, the present invention uses resistance welding techniques for welding a valve plug of such an assembly to one of: a valve stem, and a holder that functions as a intermediate component to which both the valve plug and the valve stem of the assembly are secured. Since the valve plug and valve assembly may be composed of such dissimilar materials as tungsten carbide alloys (for the plug), and stainless steal (for the valve stem), resistance welding, according to the present invention, provides an effective and reliable bond to withstand the seating and unseating forces to which such valve assemblies are subjected within spray guns.

Moreover, the present invention also includes a novel method for securing the above identified holder to the valve stem, wherein the two are secured together both by a resistance weld and a lock generated by deforming a portion of the valve stem. Furthermore, this novel securing method is capable of being used to secure together a wide variety of male and female components.

Other features and benefits of the present invention will become evident from the accompanying drawings and the detailed description herein below.

BRIEF DESCRIPTION OF DRAWINGS

FIG. 6 is a flow chart showing the steps performed in securing the valve stem 32 to the holder 28.

DETAILED DESCRIPTION

Figure 1:
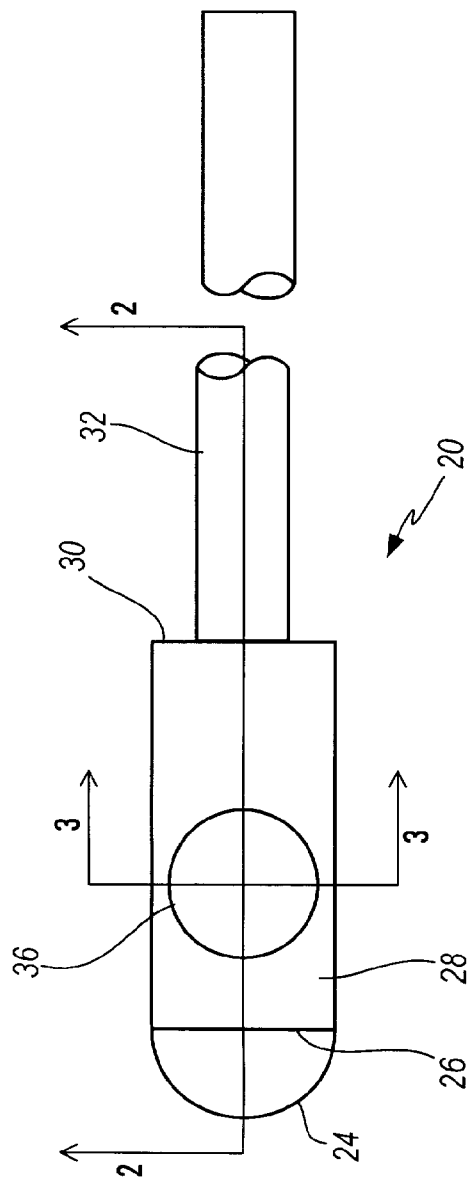
FIG. 1 is an illustration of a valve assembly 20 according to the present invention.
Figure 2:
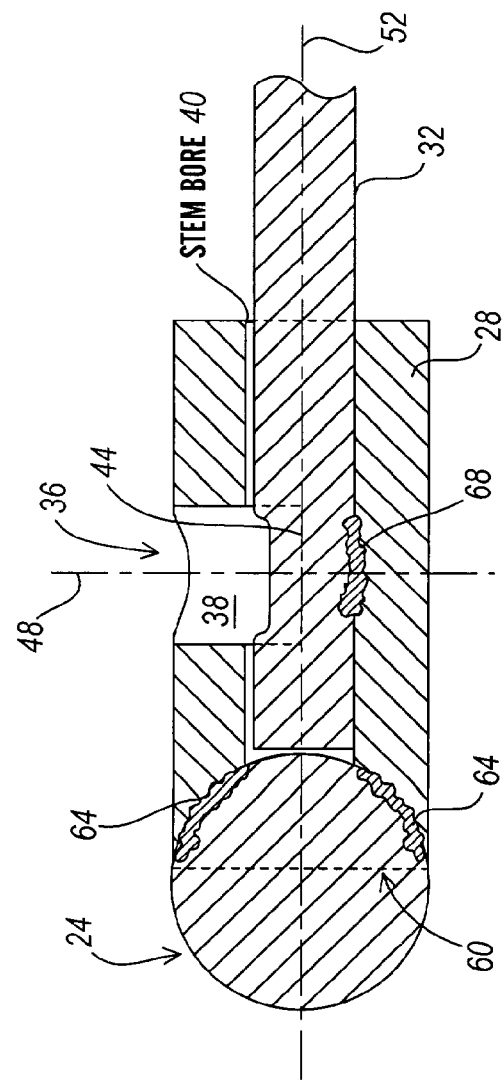
FIG. 2 is a cross-section of the valve assembly 20 of FIG. 1 identified in FIG. 1 by the sectioning view 2.

FIG. 1 shows a fully assembled embodiment of a valve assembly 20 according to the present invention. The embodiment includes a spherical plug 24 that is partially recessed and attached within the plug end 26 of the substantially cylindrical holder 28. In turn, the holder 28 is fixedly attached to a valve stem 32 at an opposite end of the holder from the plug end (i.e., the stem end 30). Additionally, the holder 28 has a traverse bore 36 that opens into a stem bore 40 (FIG. 2), the stem bore extending through the holder 28 between the plug end 26 and the stem end 30. Moreover, as shown in FIG. 2, the stem bore 40 is sized so that the valve stem 32 relatively snugly slides into the stem bore 40.

It is an aspect of the present invention that the traverse bore 36 has a larger diameter than the stem bore 40. Accordingly, as best shown in the cross-sectional representation of FIG. 3 and the perspective view of FIG. 4, a ledge 44 is provided on either side of the stem bore 40, wherein each such ledge is bounded by the wall 38 of the traverse bore 36 and the edge 56 defined by the intersection of the traverse bore 36 and the stem bore 40. In particular, assuming the center axis 48 of the traverse bore 36 intersects (or nearly so) the center axis 52 of the stem bore 40, then the ledges 44 extend along the wall 38 wherein the ledges have a variable extent in a direction orthogonal to both the center axis 48 and the center axis 52.

Figure 3:
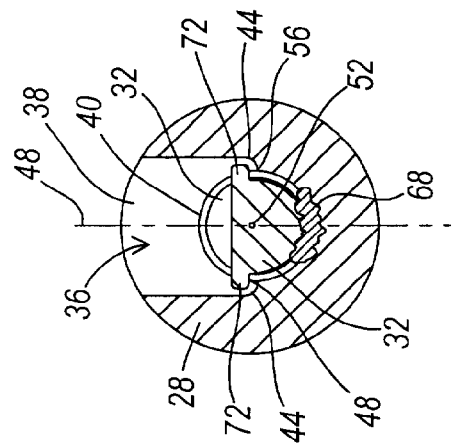
FIG. 3 shows a cross-section of the valve assembly 20 in FIG. 1 identified in FIG. 1 by the section view 3.
Figure 4:
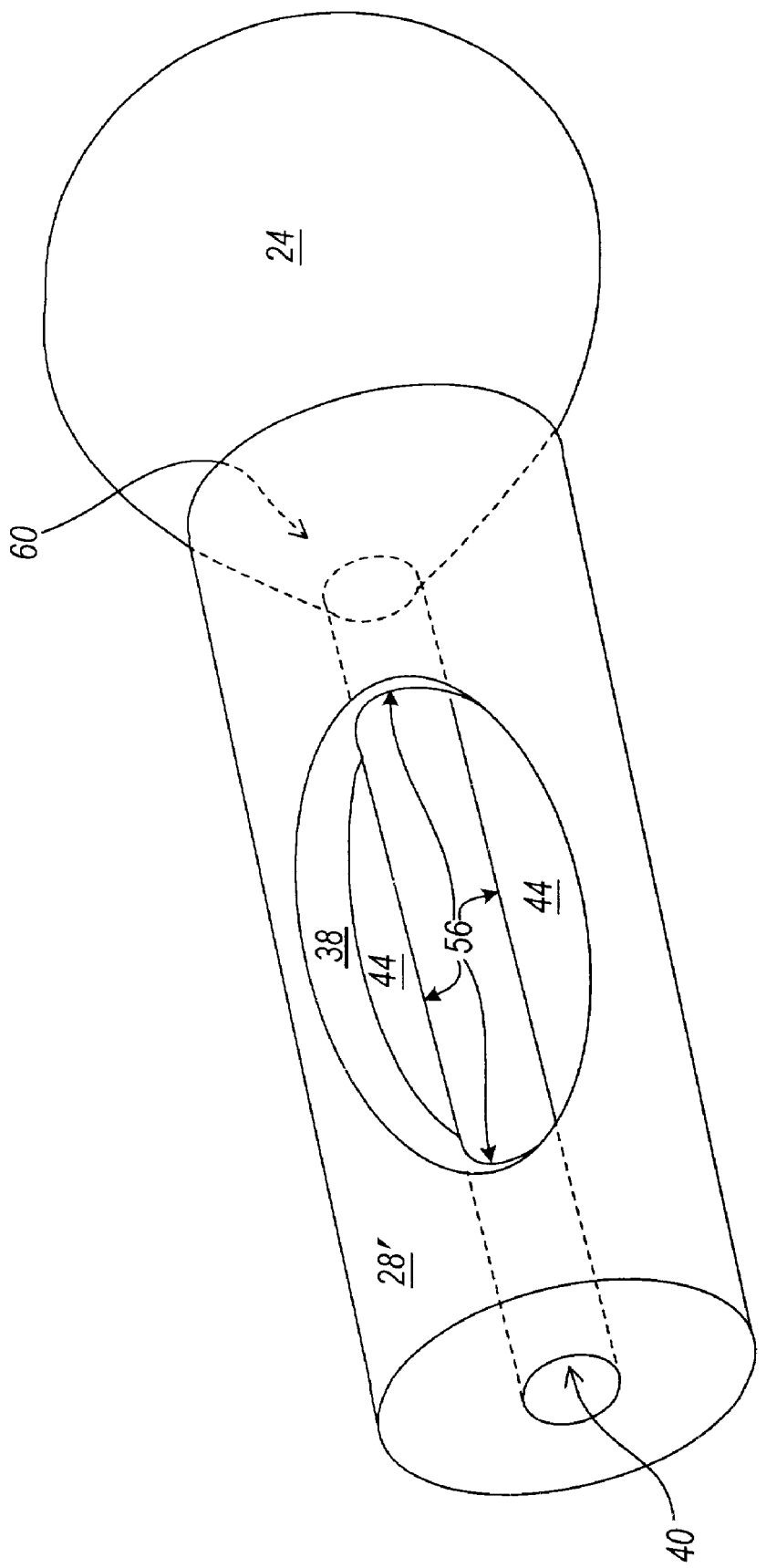
FIG. 4 shows a perspective view of the valve plug 24 and the holder 28.

The plug end of the holder 28 has a recessed opening 60 (FIGS. 2 and 4), wherein there is an annular weld 64 (FIG. 3) formed between the surface of the recessed opening 60 and the plug 24 thereby securely attaching the plug to the holder 28. In particular, the annular weld 64 is the result of a resistance welding operation described further hereinbelow. Additionally, note that the valve stem 32 is also welded to the holder 28 via stem which is weld 68. Further, note that within the traverse bore 36, the valve stem 32 has been deformed so that it extends onto the ledges 44 (FIG. 3). Accordingly, the valve stem 32 is secured within the stem bore 40 by both the stem weld 68 and the lock extensions 72 of the deformed portion of the valve stem 32.

Figure 5:
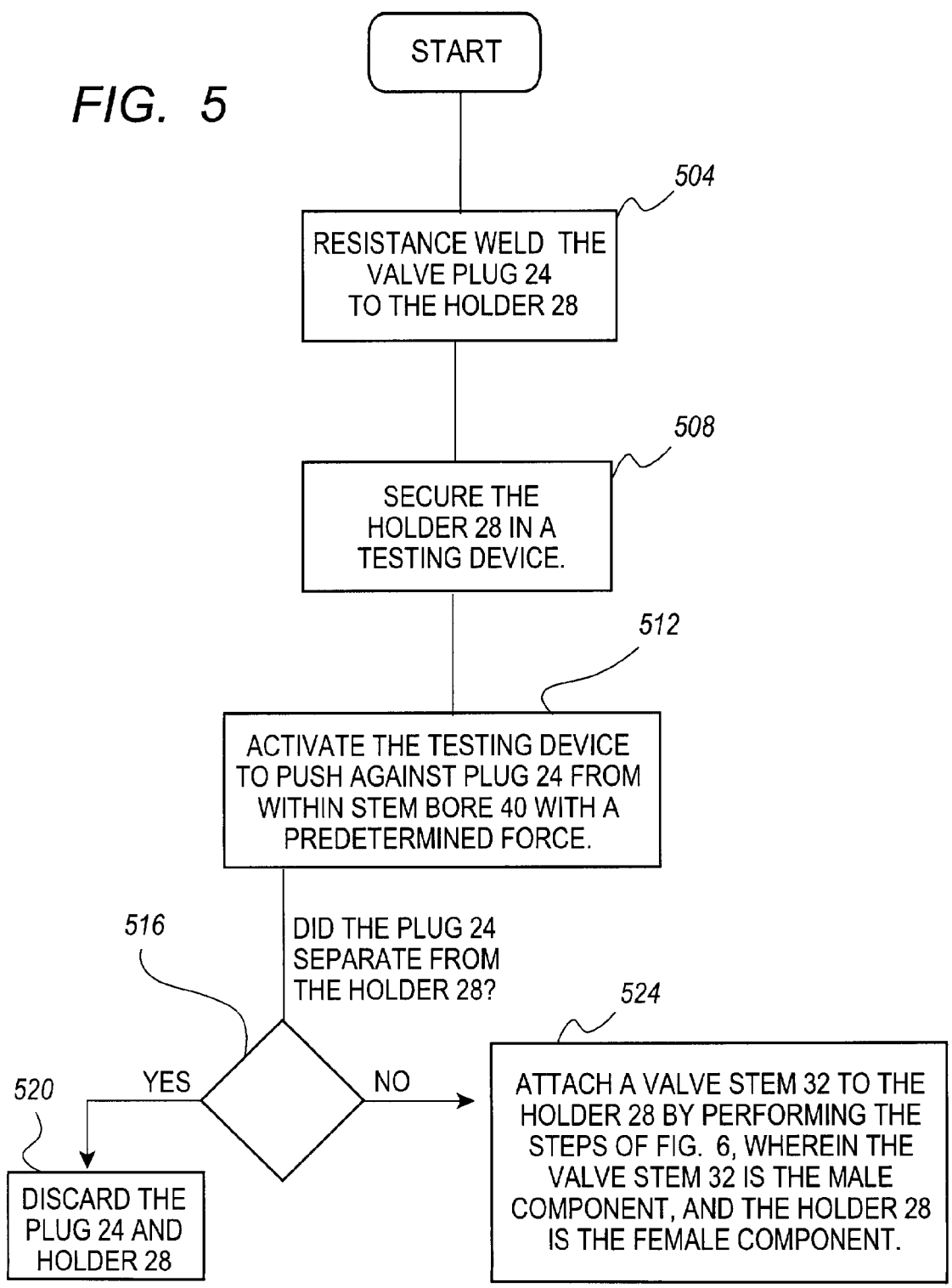
FIG. 5 is a flow chart indicating the steps performed in manufacturing the valve assembly 20.

FIGS. 5 and 6 present flowcharts for the steps performed in manufacturing the valve assembly of the present invention. In particular, regarding the steps of FIG. 5, step 504 is first performed wherein the plug 24 is resistance welded to the surface of the recessed opening 60 for forming the annular weld 64. In particular, this resistance weld is performed by placing the plug 24 into the recessed opening 60 and attaching an electrode to each of the plug and the holder such that upon applying a voltage potential therebetween, current flows through the contact areas therebetween generating sufficient heat to weld the two together. In particular, an electrical current in the range of approximately 1,700 to 3,500 amps may be applied with an effective or average voltage in the range of approximately 3.5 to 5 volts and with a weld time of approximately 20 to 40 milliseconds may be used to form to resistance weld 64. Further note that the average voltage range may be an average over some time period such as 250 microseconds and may vary between zero and, e.g., 12 volts. Also, note that a predetermined minimum force is preferably applied to the plug 24 and the holder 28 during the resistance welding process for forcing these two components together. In particular, a force of approximately 10 to 40 kilograms (and more particularly, 15 to 35 kilograms) may be applied for plugs 24 having a diameter in the range of 1/8" to 5/16"; wherein this force varies depending on, e.g., the contact area between the plug 24 and the holder 28. That is, the larger the contact area, the greater the predetermined minimum force. Of course, as one skilled in the art of resistance welding will understand, the parameters of current, voltage, minimum force, and duration of weld (i.e., duration of current flow) time are interrelated and also may depend upon the characteristics of the resistance welding device being used (e.g., welding time cycles, and the voltage(s) capable of being applied during each time cycle). Furthermore, such resistance welding parameters may also require different combinations of values for effectively resistance welding plugs 24 with different percentages of cobalt or other binders.

Resistance welding can also be used for securely joining the plug 24 and the holder 28 for a number of different combinations of materials for the plug 24 and the holder 28. For example, the holder 28 may be stainless steel, and the plug 24 may be one of: stainless steel, and various alloys of tungsten carbide including alloys having binders such as tantalum carbide, cobalt and/or nickel. In the case of tungsten carbide and cobalt, the plug 24 may be 87% to 97% tungsten carbide and 3% to 13% cobalt. More particularly, the plug 24 may be 93.5% to 94.5% tungsten carbide and 5.5% to 6.5% cobalt. Moreover, in the case where the plug 24 is tungsten carbide with such additional binder(s), the binder(s) form the weld 64.

Note that the plug 24 can be resistance welded to the holder 28 prior to providing the valve stem 32 within the stem bore 40.

Returning now to the steps of FIG. 5, in steps 508 and 512, a testing device (not shown) can be used to determine whether the plug 24 is secured sufficiently to the holder 28 for withstanding separation forces of at least the strength of those typically encountered within a high pressure fluid nozzle spray gun. In particular, the holder 28 is secured in a testing device (not shown), and in step 512, the testing device is activated to push against the plug 24 from within the stem bore 40 with a predetermined force for thereby attempting to separate the plug 24 from the holder 28. In particular, the force applied by the testing device against the plug 24 may be in the range of 50 lbs. to 150 lbs., and more particularly, in a range of 90 lbs. to 10 lbs. Accordingly, in step 516, a determination is made as to whether the plug 24 separated from the holder 28. If so, then in step 520 both the plug and the holder are discarded. Alternatively, if the plug 24 and the holder 28 do not separate, then it is presumed that an effective resistance weld was produced in step 504, and accordingly step 524 is performed wherein the valve stem 32 is secured within the stem bore 40. In particular, the securing of the valve stem 32 within the stem bore 40 is accomplished by performing the steps of the flowchart of FIG. 6 described hereinbelow. Note that the procedure of FIG. 5 is generally not possible in prior techniques for manufacturing valve assemblies since the valve stems 32 are secured within a prior art holder before a prior art valve plug is brazed onto the prior art holder. Thus, testing in the manner of the present invention, as described hereinbelow, is not possible.

Referring now to FIG. 6, the flowchart provided in this figure illustrates the steps performed in a novel (and widely applicable) method for securing male and female mating components together, wherein these components are both welded together, and mechanically locked together. Accordingly, in step 604 of FIG. 6, the male component is inserted into a female receiving bore of a female component. Thus, with reference to the components of the valve assembly 20, this step is accomplished by inserting the valve stem 32 (i.e., the male component) into the stem bore 40 (i.e., the receiving bore) of the holder 28 (i.e., the female component). Subsequently, in step 608, a first electrode is inserted in a second bore (e.g., traverse bore 36) of the female component, wherein the second bore is substantially traverse to the receiving bore, and such that:

(a) the traverse bore has a larger diameter or extent across than that of the receiving bore; and (b) the second bore forms one or more ledges, these ledges formed between an interior wall of the second bore and a boundary defining the entry of the second bore into the receiving bore. For example, such one or more ledges may be formed when the boundary of the intersection between the receiving bore and the second bore is at least partially non-coincident with the walls of the second bore. More particularly, regarding the holder 28 as the female component, the edge 56 (FIG. 4) constitutes such a boundary since it is at least partially non-coincident with the wall 38 of the traverse bore 36. Accordingly, ledges 44 are examples of the ledges being referred to here.

Additionally, note that step 608 states that the first electrode is to be inserted into the second bore to a sufficient depth and/or with a sufficient force so that:

(a) the male component within the receiving bore is contacted by the first electrode, and (b) the male component contacts an opposing surface area of the receiving bore substantially facing, and on an opposite side of, the receiving bore from where the first electrode contacts the male component. Note that this opposing surface area is located in the area of stem weld 68 in FIGS. 2 and 3. Thus, an effective electrical path is provided from the first electrode through a cross section of the male component, and through the opposing surface area of the female component. Accordingly, in the context of the valve assembly 20, this step is accomplished by providing an electrode in the traverse bore 36 so that it presses against the valve stem 32 with an effective force for inducing good electrical contact between the valve stem and the inner surface of the stem bore 40 substantially in the area where stem weld 68 is to be formed (FIG. 2).

In step 612, a second electrode is securely attached to the female component in a location wherein electrical current between the first and second electrodes will pass through the electrical path provided in step 608.

Subsequently, in step 614, an electrical current is applied between the first and second electrodes for resistance welding the male component to the opposing surface area of the receiving bore, while simultaneously applying a force to the first electrode for moving it further into the second bore and thereby deforming the now heated and malleable portion of the male component contacting and/or adjacent to the first electrode. Accordingly, the deformed portion of the male component extends outwardly from the receiving bore, thereby resting upon the one or more ledges described hereinabove. Thus, a physical lock is formed so that, as with the resistance weld concurrently formed in this step, the physical lock also inhibits the male component from separating from the receiving bore.

When applying step 614 to the manufacture of valve assembly 20, the lock extensions 72 (FIG. 3) are formed by the first electrode (not shown) pressing into the traverse bore 36 and upon the exposed portion of the valve stem 32 sufficiently during the forming of the resistance weld 68 so that the material of the valve stem 32 deforms traversely to the center axis 48. In particular, note that the force needed upon the first electrode to provide the deforming of the valve stem 32 is inversely related to the heat induced within the valve stem 32 due to the resistance welding process that forms the weld 68. Accordingly, in some embodiments of the present invention the force for deforming the valve stem can be approximately (e.g. 18 to 23 kilograms).

Finally, in step 618 of FIG. 6, the applied current is stopped and the electrodes are detached from the now securely mated male and female components.

Thus, by utilizing the flowchart of FIG. 6, the step 524 of FIG. 5 can be completed for securely attaching the valve stem 32 within the stem bore 40. Accordingly, the resulting valve assembly 20 is highly reliable and is not likely to come apart when in use in a fluid spray gun.

Moreover, it is important to note that the generality of the flowchart of FIG. 6 makes the method it embodies applicable to a wide variety of applications wherein male/female components must be secured together. In particular, applications related to the manufacture of probes, styli, and plug gauges.

Additionally, regarding the valve assembly 20, note that various other embodiments of this assembly may be manufactured according to the present invention. For example, instead of the plug 24 being spherical, such a plug may alternatively be substantially conical and/or parabolic in its configuration extending away from the holder 28. Thus, such a plug would have a shape that might be characterized as substantially egg shaped. Moreover, in another embodiment of the present invention, the plug 24 and the holder 28 can be machined as a single part wherein the plug portion of this part can be of any desired configuration (e.g. spherical, conical, parabolic, etc.). However, in each of these embodiments a preferred method for securing the valve stem 32 within the stem bore 40 is as described as hereinabove, and in particular utilizing the steps of FIG. 6.

In another embodiment of the present invention, the valve stem 32 and the valve plug 24 may be resistance welded together without a holder 28 therebetween. In one such embodiment, the end of the valve stem 32 to be attached to the plug 24 is flared by, e.g., cold heading or some other process, thereby increasing the valve stem area that contacts the plug 24. In particular, flared end may have a concave or recessed surface into which the plug 24 may fit. Note that by increasing this contact area, larger and stronger resistance welds can be formed. Accordingly, to weld the plug 24 and the valve stem together, a first electrode is attached to the plug and a second electrode is attached to the valve stem 32. Then, using values of such welding parameters as current voltage, weld time, and minimum predetermined force as discussed hereinabove, the plug 24 is secured to the valve stem 32.

In another embodiment of the present invention, the holder 28 and the valve stem 32 may be secured together by any one of a number of alternative techniques such as: (a) deforming the valve stem 32 within the stem bore 40 by impacting the valve stem 32 portion exposed by the traverse bore 36 with a punch; (b) crimping the holder 28 onto the inserted valve stem portion; and (c) threading the valve stem within the holder 28 that is also threaded.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for attaching a spray gun plug seat to a valve stem, comprising:

first attaching a valve plug to a first electrode, wherein said valve plug is approximately 97% to 87% tungsten carbide and approximately 3% to 13% cobalt;

second attaching a holder for said valve plug to a second electrode, wherein said holder has a first end for contacting said valve plug, and a second end for receiving said valve stem;

pressing said valve plug and said holder together with at least a predetermined force in a range of approximately 10 to 40 kilograms;

causing an electrical current to flow between said valve plug and said first end, during said step of pressing, wherein said current is effective for providing a resistance weld for securing said valve plug and said holder together, providing a stem end of said valve stem within a bore of said holder, said bore open to said second end; and securing said stem end within said bore.

2. The method as claimed in claim 1, wherein said valve plug is approximately 94.5% to 93.5% tungsten carbide and approximately 5.5% to 6.5% cobalt.

3. The method as claimed in claim 1, wherein said valve plug is one of substantially spherical, includes a substantially conical shape, and includes a substantially parabolic shape.

4. The method as claimed in claim 1, wherein said step of causing includes a flowing of current in a range of approximately 1,700 to 3,500 amps between said valve plug and said first end with an average voltage in a range of approximately 3.5 to 5 volts.

5. The method as claimed in claim 1, wherein said step of providing includes inserting said stem end into said bore, wherein said valve stem end is substantially aligned with an axis approximately passing through said bore and a center of said valve plug.

6. The method of claim 1, wherein said predetermined force is in a range of 15 to 35 kilograms.

* * * * *